Jan. 13, 1970   J. L. OWENS ET AL   3,488,890
METHOD OF AND APPARATUS FOR ADJUSTING FILM RESISTORS
TO A DESIRED RESISTANCE VALUE
Filed March 9, 1967   5 Sheets-Sheet 1
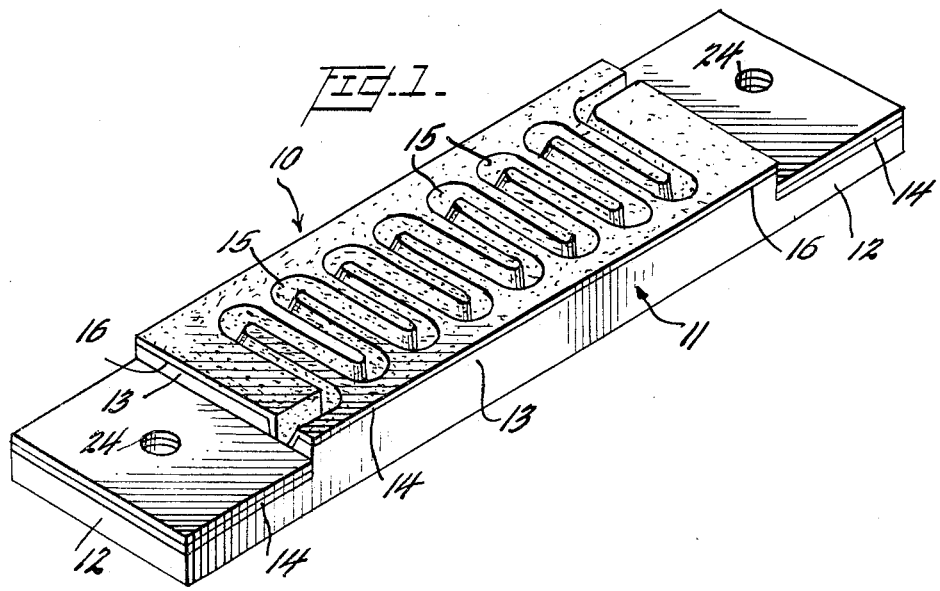
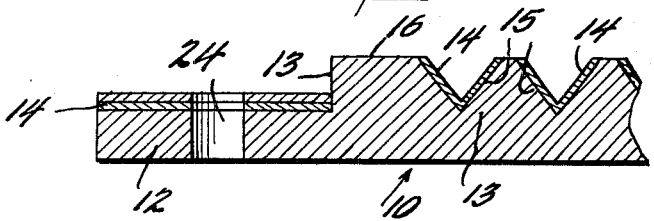
Inventors
James L. Owens
George S. White,
By
S. A. Becker
Attorney

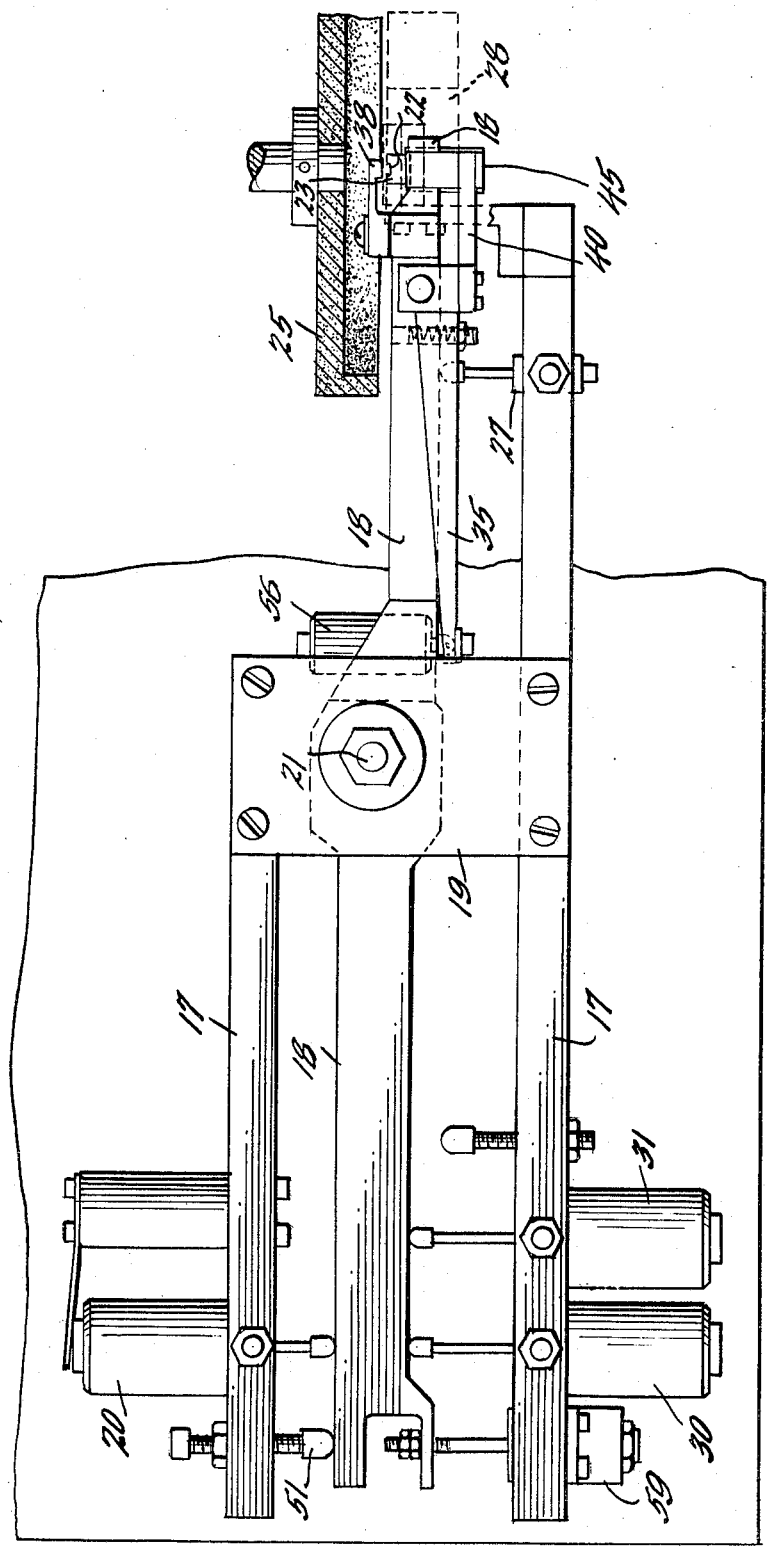

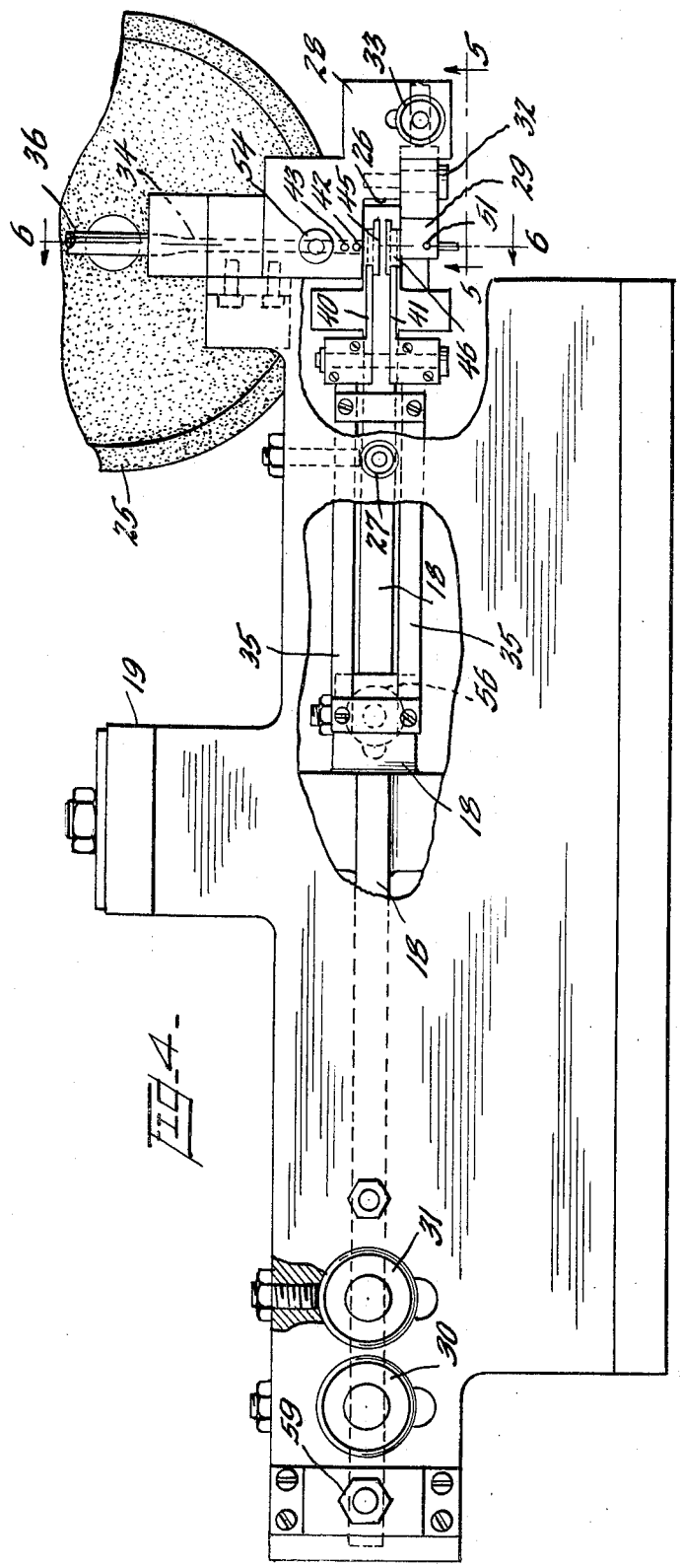

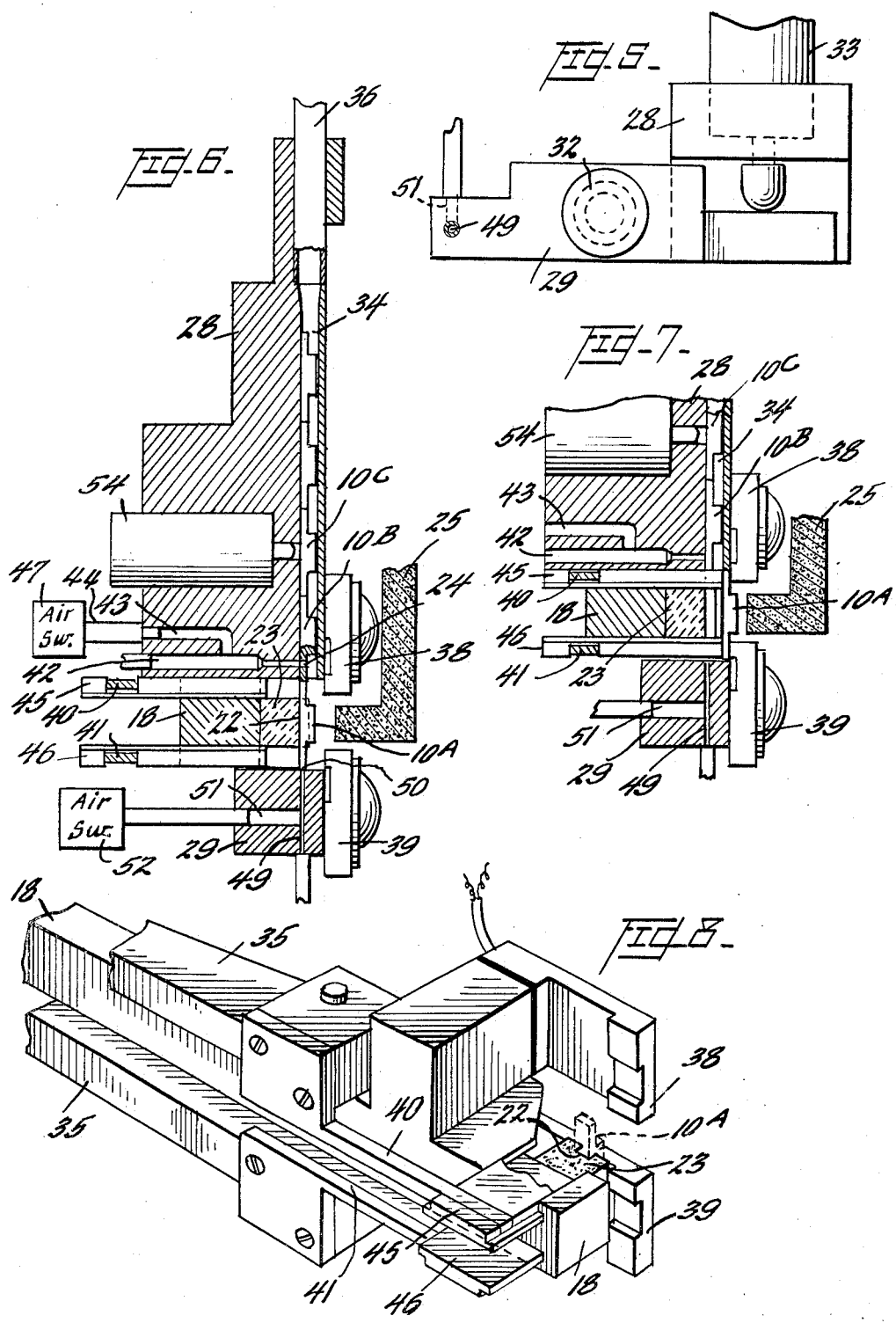

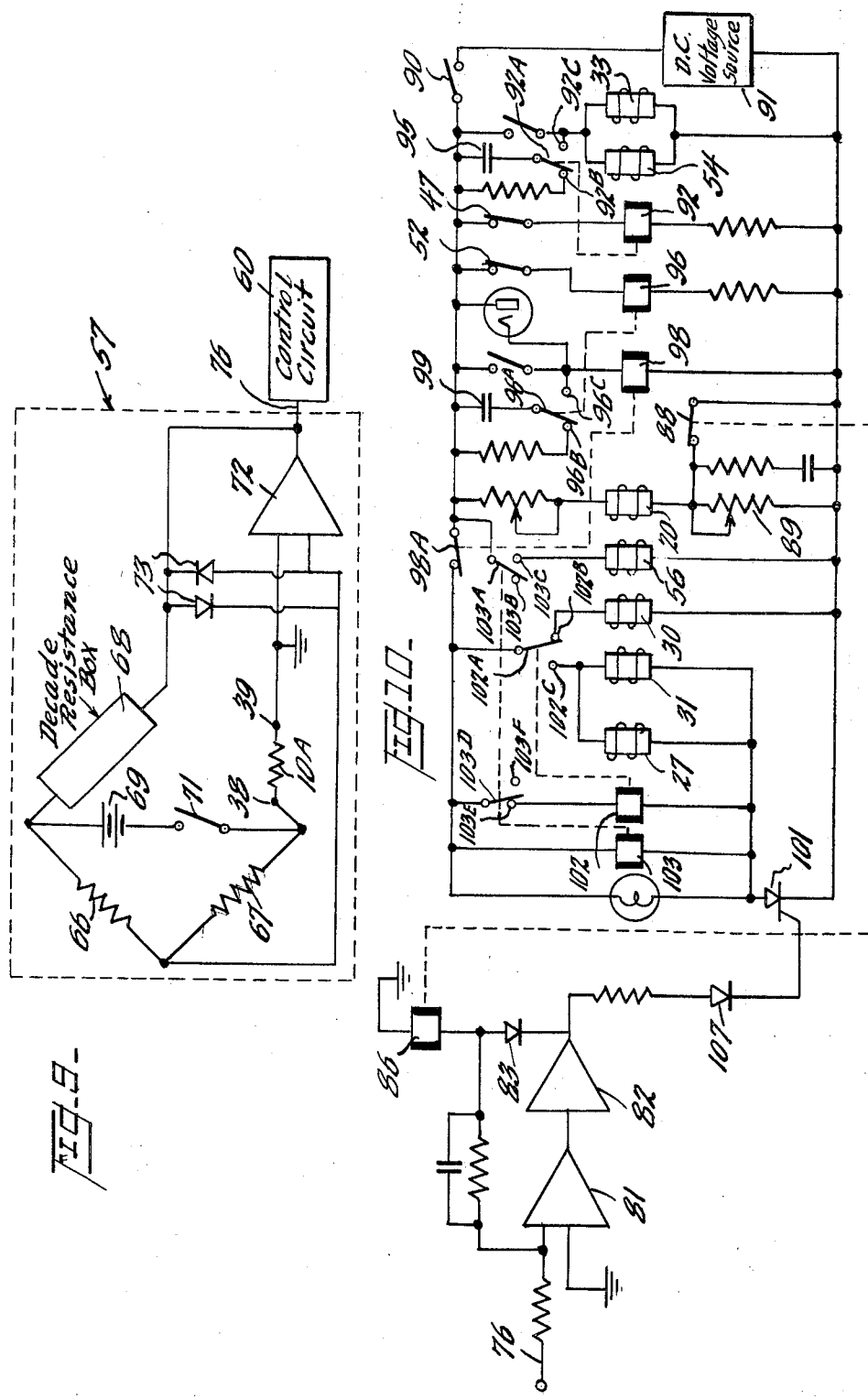

United States Patent Office 3,488,890
Patented Jan. 13, 1970

3,488,890
METHOD OF AND APPARATUS FOR ADJUSTING FILM RESISTORS TO A DESIRED RESISTANCE VALUE
James L. Owens, Clemmons, and George S. White, Winston-Salem, N.C., assignors to Western Electric Company, Incorporated, New York, N.Y., a corporation of New York
Filed Mar. 9, 1967, Ser. No. 622,869
Int. Cl. B24b 49/00, 51/00, 1/00
U.S. Cl. 51—165                                    9 Claims

ABSTRACT OF THE DISCLOSURE

A method of and an apparatus for adjusting film resistors to a desired resistance value which includes removing a portion of the resistive film at a first rate while continuously monitoring the resistance value. Upon reaching a predetermined resistance value, less than the desired resistance value, the resistive film is removed at a second rate which is less than the first rate until the desired resistance value is reached. Facilities are provided for ascertaining that a resistor is properly loaded in the apparatus before removal of the resistive film commences.

BACKGROUND

In the manufacture of film resistors, such as the highly stable tantalum nitride film resistor disclosed in D. Gerstenberg Patent 3,242,006, sufficient resistive film is deposited on a substrate so that the resistors initially have a resistance value less than a desired value. Subsequently, the resistance is increased to a desired value by removing a portion of the deposited film. It is particularly advantageous in the manufacture of tantalum nitride film resistors to be able to adjust them to a precise predetermined value in order to take advantage of their high stability.

In the prior art, abrading apparatus is available for continuously monitoring a resistor while a portion of the resistance film is removed at a certain rate. When the desired resistance value is reached, facilities are actuated to discontinue removal of the resistive film. The major difficulty, however, lies in preventing "overshoot," which is abrading too much thereby increasing the resistance to too high a value. Once the resistor is adjusted to a value greater than the desired value it must be discarded. If the rate of removal of the resistive film is very fast, then it is increasingly difficult to prevent "overshoot." If the rate of removal is very slow, then it is impractical for use in large-scale production.

SUMMARY OF THE INVENTION

A method of adjusting film resistors to value includes removing a portion of the resistive material at a first rate. The resistance value is continuously monitored during the removal of the resistive film. Upon reaching a predetermined resistance value which is relatively close to, but less than, the desired resistance value, the rate of removal is decreased to a second rate. The removal of the resistive film continues at the decreased second rate until the desired resistance value is reached, whereupon removal of the resistive film is immediately discontinued.

The apparatus for adjusting film resistors to value includes a pivotable holding arm into which a film resistor is loaded. Facilities are provided to detect the presence of a whole resistor within the holding arm and to eject a broken resistor, if present. When a whole resistor is properly positioned within the holding arm, the holding arm is moved toward a film removing facility, such as an abrading wheel. Two contact fingers, which are mounted on the holding arm engage the termination ends of the resistor. The contact fingers are connected to a resistance monitoring circuit which continuously monitors the value of the resistance during the entire resistance adjusting operation. When the value of the resistance approaches a predetermined value, relatively close to, but less than the desired resistance value, facilities are actuated to reduce the force with which the resistor is held against the abrading wheel in order to provide a slower rate of removal of the resistive film until the desired value is reached. When the desired resistance value is reached, facilities are actuated to immediately pivot the holding arm out of engagement with the abrading wheel whereupon the adjusted resistor is ejected from the holding arm.

BRIEF DESCRIPTION OF THE DRAWINGS

FIG. 1 is an enlarged perspective view of a film resistor prior to being adjusted to value;

FIG. 2 is an enlarged partial cross-sectional view of a film resistor which has been adjusted to value;

FIG. 3 is a plan view of the apparatus embodying the principles of this invention;

FIG. 4 is a front elevational view of the apparatus shown in FIG. 3;

FIG. 5 is a view along line 5—5 in FIG. 4, showing the facilities for ejecting broken resistors;

FIG. 6 is an enlarged vertical cross-sectional view along line 6—6 in FIG. 4, showing the holding arm in the load position and illustrating the facilities for ascertaining that a whole resistor is properly loaded;

FIG. 7 is an enlarged vertical cross-sectional view of the holding arm, with the contact fingers in engagement with the termination ends of the resistor;

FIG. 8 is a partial perspective view of the grooved end of the holding arm showing the facilities for holding a resistor therein;

FIG. 9 is an electrical schematic of the circuit for monitoring the resistance value during removal of the resistive film; and FIG. 10 is an electrical schematic of the control circuit for the apparatus.

DESCRIPTION OF THE INVENTION

Referring now to FIG. 1, there is shown a film resistor 10 prior to being adjusted to value including a substrate 11 having termination end portions 12 and a raised central portion 13. The substrate 11 may be ceramic, glass, or other suitable non-conductive material. The central portion 13 has grooves 15 formed in the upper surface 16 thereof which are substantially V-shaped in cross-section and form a path from one termination end portion 12 to the other. A resistive metal film 14, such as tantalum nitride, is initially deposited over the entire upper surface of the substrate 11, including the end portions 12, the grooves 15, and the upper surface 16 of the central portion 13. Then the central portion 13 is masked and a termination metal, such as gold, is deposited over the resistive film 14 on the termination ends 12. The resistor is then adjusted to value by removing all of the film deposited on the upper surface 16 and a portion of the film deposited in the grooves 15, as illustrated in FIG. 2, to provide a path of resistive material having a desired resistance value. Afterwards, wire leads (not shown) are inserted through apertures 24 in the termination ends 12 and are soldered thereto.

Referring to FIGS. 3 and 4, there is shown apparatus for adjusting film resistors to value including a frame 17 on which a resistor holding arm 18 is pivotally mounted to a crossbar 19 of the frame 17 by a shaft 21. The holding arm 18 has a ceramic block 23 mounted to one end having a groove 22 therein for receiving a resistor 10. Movement of the arm 18 toward and away from a rotating abrading wheel 25 is controlled by solenoids 20, 27, 30, and 31 which are mounted to the frame 17. The grooved block 23 and the end of the arm 18 fit within a recess 26 formed in a feed block 28, as shown in FIG. 4. A support block 29 is positioned beneath the recess 26 to support a resistor which is loaded into the groove 22. The support block 29 is pivotally mounted by a pin 32 to the feed block 28 and is movable by a solenoid 33 which is mounted to the feed block 28, as shown in FIG. 5. The feed block 28 has a passageway 34 therethrough for receiving resistors fed in proper orientation from a supply tube 36.

The holding arm 18 has a clamping arm 35 pivotally mounted thereto which is movable by a solenoid 56 mounted on the arm 18. The end of the clamping arm 35 has a pair of leaf springs 40 and 41 fixed thereto, the ends of which engage slides 45 and 46 which are movable over the end of the holding arm 18 and the block 23 as shown in FIGS. 6, 7 and 8. The holding arm 18 has a pair of contact fingers 38 and 39 mounted thereon which are positioned to be in alignment with the termination ends 12 of a resistor loaded in groove 22. When solenoid 56 is energized, the clamping arm 35 pivots with respect to the holding arm 18 and springs 40 and 41 urge slides 45 and 46 against a resistor loaded in groove 22. This moves the resistor into engagement with the contact fingers 38 and 39 (FIG. 7) which are connected to a resistance monitoring circuit 57. The resistance monitoring circuit, described more fully hereinafter, continuously monitors the resistance value of resistor 10 during the adjusting operation.

Before a resistor is loaded into the groove 22, the arm 18 is held by solenoids 27 and 31 in the position shown in FIG. 7. The solenoid 27 is adjusted to act as a stop to limit the movement of arm 18 when the solenoid 31 is energized. Solenoids 27 and 31 are then de-energized and solenoid 30 is energized to move the arm 18 to a loading position (FIG. 6) wherein the groove 22 is in alignment with the passageway 34 in the feed block 28. Solenoid 56 is de-energized so that slides 45 and 46 do not contact the resistor. An adjustable stop 51 (FIG. 3), mounted to frame 17, is provided to limit clockwise movement of the arm 18 and thus insure accurate alignment of the groove 22 with passageway 34.

Resistor substrates 11 are frequently made of a material, such as ceramic, which breaks rather easily. To prevent jamming or damage to the apparatus caused by a broken substrate, facilities are provided to ascertain or detect when a whole resistor is loaded into the groove 22 of the block 23 before the arm 18 is moved toward the abrading wheel 25. In FIG. 6, there is shown the passageway 34 in the feed block 28 into which properly oriented resistors 10 are fed. The feed block 28 has a passageway 42 therethrough which is positioned to be in alignment with the lower terminal hole 24 of a resistor designated 10B which is positioned immediately above the resistor designated 10A loaded into the groove 22 in the block 23. A second passageway 43 in the feed block 28 has one end communicating with passageway 42 and the other end connected to a tube 44 which is connected to an air switch 47. When air is introduced into passageway 42, and resistor 10A is not broken, the lower terminal hole 24 of resistor 10B is in alignment with the passageway 42 and air passes therethrough out of the feed block 28. However, if resistor 10A is broken, the passageway 42 will be blocked by resistor 10B, thus directing air into passageway 43 and through tube 44 to open the air switch 47.

When air switch 47 is opened, a solenoid 54, mounted in the feed block 28, is energized and urges the resistor designated 10C against the wall of the passageway 34 to prevent the remaining resistors in the passageway 34 from dropping. Simultaneously, therewith, solenoid 33 (FIGS. 4 and 5) is energized to pivot the support block 29 away from the arm 18, allowing the broken resistor 10A and resistor 10B to drop out of the passageway 34. Solenoids 33 and 54 are only momentarily energized so that the support block 29 quickly returns to its initial position and another resistor drops down the passageway 34 into the groove 22.

Occasionally, when a resistor is fed into the groove 22, it may be improperly positioned therein, or the resistor may be broken in such a manner that it does not cause the blockage of passageway 42. To detect whether a whole resistor is properly positioned in the groove 22, support block 29 has a passageway 49 (FIG. 6) therethrough which terminates at an opening 50 which is blocked when a whole resistor 10A is properly positioned in the groove 22. The support block 29 has another passageway 51 therein which communicates with passageway 49 and connects it to an air switch 52. When air is introduced into passageway 49 and a resistor blocks the opening 50, air is directed into passageway 51 to open the air switch 52 which permits solenoid 20 to move tthe arm 18 toward the abrading wheel 25. Simultaneously therewith, solenoid 56 is energized to pivot the clamping arm 35 to move the slides 45 and 46 so that the termination ends 12 of the resistor 10A move into engagement with the contact fingers 38 and 39, as shown in FIG. 7.

The resistor 10A is now securely held as it is moved toward the abrading wheel 25. A dashpot 59 (FIG. 3) mounted to the frame 17, engages the arm 18 just prior to contact between the resistor and the abrading wheel 25 to eliminate vibration and bounce at the moment of impact. The abrading wheel 25 is mounted sufficiently close to the feed block 28 so that the upper slide 45 in the end of the holding arm 18 blocks the bottom of passageway 34 when the resistor 10A is moved into contact with the wheel 25, thus maintaining the other resistors within the feed block 28 during the adjustment of resistor 10A. The force applied by solenoid 56, through the arm 35, springs 40 and 41, and slides 45 and 46 to the resistor 10A, is sufficient to maintain the termination ends 12 in contact with the contact fingers 38 and 39 during the abrading operation. It is to be noted that the abrading wheel 25 has an abrasive surface substantially equal in length to the raised central portion 13 of the resistor. This permits the film 14 to be uniformly removed by the wheel 25 over the entire length of the central portion 13.

The contact fingers 38 and 39 are part of a resistance monitoring circuit 57 including a bridge having matched resistors 66 and 67, and a decade resistance box 68 in three arms of the bridge as shown in FIG. 9. The resistor 10A, in contact with contact fingers 38 and 39, makes up the fourth arm of the bridge. A battery 69 is connected between the junction of resistors 67 and 10A and the junction of resistors 66 and 68 with a switch 71 connected in series therewith. One input of a high-gain chopper-stabilized operational D.C. inverter amplifier 72 is connected to the junction of resistors 66 and 67. One end of the resistor 10A is connected to the other input of the amplifier 72 which is connected to ground. The output 76 of the amplifier 72 is connected to one end of decade resistance box 68. Diodes 73 connect the output 76 to one of the inputs of the amplifier 72, as shown, to prevent overloading the resistance monitoring circuit 57. The output voltage, or error signal, from the resistance monitoring circuit 57 is proportional to the percentage devitation of the resistor 10A from the resistance set on decade resistance box 68, and is applied to the control circuit 60, shown in FIG. 10.

When the resistor 10A is properly loaded into the arm 18, the solenoid 30 is de-energized to allow the solenoid 20 to urge the resistor 10A against the abrading wheel 25 with a first force which is controlled by passing a predetermined current through the solenoid 20 to generate a predetermined magnetic field. This first force is sufficient to cause the abrading wheel 25 to rapidly remove a portion of the resistive film 14 thereby rapidly increasing the resistance toward the desired value.

As the resistance value approaches the desired value, the magnitude of the error signal from the resistance monitoring circuit 57 decreases. When the magnitude decreases to a predetermined value, the control circuit 60 reduces the current passing through solenoid 20, which decreases the strength of the magnetic field and consequently decreases the force urging the resistor 10A against the abrading wheel 25. This decrease in force results in a decreased or slower rate of removal of the resistive film 14 at the critical point where the resistance is approaching its desired value. By initially abrading at a fast rate, and then changing to a slow rate, it is possible to very accurately adjust resistors to value in a minimum of time.

When the resistance monitoring circuit 57 indicates that the resistor 10A is adjusted to value, the control circuit 60 energizes solenoid 31 to immediately force the holding arm 18 and the adjusted resistor 10A away from the abrading wheel 25, thus terminating the removal of resistive material. The adjusted resistor 10A is then ejected by an air jet (not shown) which also removes any abraded material or residue deposited in the groove 22 of the block 23.

OPERATION

In describing a cycle of operation, consider that a resistor 10A has dropped into the groove 22 when the switch 90 is closed, supplying a voltage from D.C. voltage source 91 to the control circuit 60, shown in FIG. 10. Additionally, the switch 71 in the resistance monitoring circuit 57 (FIG. 9) is closed. At this point, solenoid 30 is energized and holds the arm 18 in the loading position shown in FIG. 6, wherein the groove 22 is in alignment with the passageway 34 in the feed block 28.

If a broken resistor is positioned in the groove 22, a terminal hole 24 will not be aligned with the passageway 42 in the feed block 28. Thus, air directed into passageway 42 goes through passageway 43 and opens switch 47 which de-energizes a relay 92 moving armature 92A from contact 92B to contact 92C thereby energizing solenoids 54 and 33 through a capacitor 95. The solenoid 54, mounted in the feed block 28, as shown in FIG. 6, urges resistor 10C against the wall of the passageway 34 when energized to prevent downward movement of the other resistors, while energized solenoid 33 pivots the support block 29 to allow the resistors 10A and 10B to drop out of the passageway 34. When the capacitor 95 is fully charged, solenoids 33 and 54 are de-energized, respectively, permitting the support block 29 to return to its original position and the resistors in passageway 34 to drop.

To detect that a whole resistor 10A is properly loaded into the groove 22, air is directed through passageway 49 in the support block 29 and, if opening 50 is blocked by a properly positioned resistor as shown in FIG. 6, air switch 52 is opened to de-energize a relay 96. When relay 96 is de-energized, its armature 96A moves from contact 96B to contact 96C thereby energizing relay 98 through capacitor 99. The energization of relay 98 opens normally closed contact 98A, interrupting the voltage from source 91 to a silicon controlled rectifier 101 causing it to stop conducting. When the silicon controlled rectifier 101 stops conducting, a time delay relay 103 is operated to move armature 103A from contact 103B to contact 103C thereby energizing solenoid 56 which moves the slides 45 and 46 so that the termination ends 12 of the resistor 10A move into engagement with the contact fingers 38 and 39 as shown in FIG. 7. Additionally, time delay relay 103 moves armature 103D from contact 103E to contact 103F. Simultaneously therewith, a time delay relay 102 is operated to move armature 102A from contact 102B to contact 102C thereby de-energizing solenoid 30.

Since contact 88 is normally closed solenoid 20 is always energized, and moves the holding arm 18 toward the abrading wheel 25 when solenoid 30 is de-energized. Since contact fingers 38 and 39 are in engagement with the resistor 10A, the resistor 10A is now in the resistance monitoring circuit 57 and an error signal is generated therefrom corresponding to the percentage deviation between the desired resistance value set on the decade resistance box 68 and the resistance value of the resistor 10A.

As shown in FIG. 10, the error signal from the output of resistance monitoring circuit 57 is applied to a first amplifier 81 and a serially connected booster amplifier 82. When the magnitude of the error signal is large, the output from amplifier 82 forward biases a diode 83 which provides a stability feedback signal into the amplifier 81. As the resistor 10A is abraded, the resistance value approaches the desired value set on the decade resistance box 68 and thus the magnitude of the error signal applied to control circuit 60 decreases. When the error signal is reduced to a certain magnitude, diode 83 becomes non-conductive, thereby de-energizing a relay 86. De-energization of relay 86 opens contact 88 removing the short across a variable resistor 89. The resistor 89 is adjusted to reduce the current through solenoid 20 which in turn reduces the force with which the resistor 10A is held against the abrading wheel 25. This decrease in force slows down the removal of the resistive film 14 at the critical point wherein the resistance value of resistor 10A is close to, but still less than, the desired resistance value preset on decade resistance box 68.

The resistor 10A continues to be abraded at the slow rate until it reaches the desired value wherein the error signal from the resistance monitoring circuit 57 is zero. When the error signal crosses zero, the output from booster amplifier 82 becomes positive, forward biasing a diode 107 and applying a gating voltage to silicon controlled rectifier 101 triggering it to conduct. When rectifier 101 conducts, the solenoid 31 is energized to immediately pivot the holding arm 18 and the adjusted resistor away from the abrading wheel 25. Solenoid 27 is also energized to stop the holding arm 18 at an unload position. A predetermined time after the silicon controlled rectifier 101 conducts, the time delay relay 103 moves the armature 103A from contact 103C to contact 103B and moves the armature 103D from contact 103F to contact 103E. This de-energizes solenoid 56, which releases the adjusted resistor 10A, permitting an air jet (not shown) to eject the adjusted resistor from the groove 22. Simultaneously, this operates time delay relay 102 which, after a predetermined time, moves armature 102A from contact 102C to contact 102B, thereby de-energizing solenoids 27 and 31 and energizing solenoid 30 to move the holding arm 18 from the unload position to the load position shown in FIG. 6 where another resistor is loaded into the groove 22. This completes one cycle of operation.

It is to be understood that the above-described invention is merely illustrative of an application of the principles of this invention and that numerous other arrangements and modifications may be made within the spirit and scope of the invention.

What is claimed is:

1. A method of adjusting a resistor having a resistive film to a desired resistance value, comprising:
   removing a portion of the resistive film at a first rate;
   monitoring the resistance value of the resistor during said removal;
   reducing the film removal rate when the resistance value reaches a predetermined value, which is relatively close to, but less than, the desired resistance value; and
   stopping the removal of the resistive film when the resistance value reaches the desired value.

2. A method of adjusting a resistor having a resistive film to a desired resistance value comprising:
   urging the resistive film against an abrasive surface with a first force;
   moving the abrasive surface relative to the resistive film to remove a portion of said film at a first rate;

monitoring the resistance value of the resistor during the removal of said film;

reducing said first force so that said resistive film is removed at a slower rate when the resistance value becomes relatively close to the desired value; and discontinuing removal of said resistive film upon said resistance value reaching said desired resistance value.

3. A method of abrading a resistor to a desired resistance value, said resistor having a resistive film deposited on a dielectric substrate, said film initially having a resistance value less than the desired resistance value, comprising:

abrading the resistive film at a first rate to rapidly increased the resistance value of the resistor;

monitoring the resistance value during the abrading;

abrading the resistive film at a second rate, slower than said first rate, upon the resistance value increasing to a predetermined value which is relatively close to the desired resistance value; and discontinuing the abrading upon the resistance value reaching the desired value.

4. A method of abrading a resistor having a resistive film to a desired resistance value comprising:

urging the resistive film against a moving abrasive surface with a first force to rapidly remove a portion of the resistive film;

monitoring the resistance value of the resistor during abrading;

decreasing said first force to a second force upon said resistance value increasing to a predetermined resistance value less than the desired resistance value;

urging said resistive film against said abrasive surface with said second force to slowly remove a portion of said resistive film until said desired resistance value is reached; and then moving said resistor out of engagement with said abrasive surface.

5. Apparatus for abrading resistors having a resistive film to a desired resistance value comprising:

means for removing a portion of the resistive film;

means for moving the resistive film against said removing means with a first force;

means for monitoring the resistance value of the resistor during removal of said film;

means responsive to said monitoring means determining that a predetermined resistance value of the resistor is reached, said predetermined resistance value being relatively close to, but less than the desired resistance value, for decreasing the relative force of said resistive film against said removing means; and means responsive to said monitoring means determining that said desired resistance value of the resistor is reached for moving the adjusted resistor away from said removing means.

6. Apparatus for adjusting a resistor having a resistive film to a desired resistance value, comprising:

abrading means;

means for receiving and moving the resistive film against said abrading means with a first force to remove a portion of the resistive film at a first rate;

means for continuously monitoring the resistance value of said resistor during removal of the resistive film;

means responsive to said resistance monitoring means indicating that the resistance value of said resistor has reached a predetermined resistance value which is relatively close to, but less than, the desired resistance value for decreasing said first force to a second force to remove a portion of the resistive film at a slower rate; and means responsive to said resistance monitoring means indicating that the resistance value of the resistor has reached the desired resistance value for moving the adjusted resistor away from the abrading means.

7. Apparatus for adjusting a resistor having a resistive film to a desired resistance value comprising:

means for removing a portion of the resistive film;

means for selectively holding said resistor against said removing means with either a first force or a second force which is less than said first force;

means for monitoring the resistance value of said resistor during the removal of said resistive film and for generating a signal corresponding to the actual resistance value of said resistor;

means responsive to the monitoring means generating a signal of a predetermined value, less than that corresponding to the desired resistance value of said resistor, for operating said holding means so that said resistor is held against said removing means with said second force; and means responsive to the monitoring means generating a signal indicating that said resistor is adjusted to the desired resistance value for moving the holding means away from the removing means.

8. Apparatus for adjusting a resistor to a desired resistance value, said resistor including a substrate having a resistive film deposited on the upper surface thereof, said substrate having termination end portions and a raised central portion, said central portion having a groove formed therein leading from one termination end portion to the other, comprising:

abrading means;

means for holding said resistor with said raised central portion facing said abrading means;

means for monitoring the resistance value of said resistor during the adjusting thereof;

means mounted to said holding means for engaging the termination ends of said resistor to connect said resistor to said resistance monitoring means;

means for moving said holding means so that said central portion of said resistor is urged against said abrading means with a first force to remove a portion of the resistive film deposited on said raised central portion at a first rate;

means responsive to said resistance monitoring means indicating that the resistance value is relatively close to, but less than, the desired resistance value for reducing the first force to a second force to remove a portion of the resistive film deposited on said raised central portion at a second rate; and means responsive to said resistance monitoring means indicating that said resistor is adjusted to the desired resistance value for moving said holding means away from said abrading means.

9. Apparatus for adjusting a film resistor to a desired resistance value, comprising:

a frame;

a holding arm for receiving a resistor in one end thereof pivotally mounted to said frame;

abrading means mounted adjacent to the resistor receiving end of said holding arm;

first means for detecting that an unbroken resistor is received in said holding arm;

means responsive to said first detecting means ascertaining that a broken resistor is received in said holding arm for ejecting said broken resistor;

a resistance monitoring circuit for continuously monitoring the resistance value of said resistor during the adjusting thereof;

second means for detecting that a resistor is properly positioned in said holding arm;

means responsive to said second detecting means ascertaining that a resistor is properly positioned in said arm for (1) pivoting said holding arm so that said resistor is urged against said abrading means with a first force, and (2) connecting said resistor into said resistance monitoring circuit;

means responsive to said monitoring circuit indicating that the resistance value of said resistor is relatively close to, but less than, the desired resistance value for decreasing the force with which said resistor is urged against said abrading means; and means responsive to said monitoring circuit indicating that the resistor is adjusted to the desired resistance value for pivoting said arm away from said abrading means.

References Cited

UNITED STATES PATENTS

| | | | |
|---|---|---|---|
| 2,023,777 | 12/1935 | Balsiger | 51—165 |
| 2,884,746 | 5/1959 | Rus et al. | 51—37 |
| 3,046,706 | 7/1962 | Price | 51—165 |
| 3,063,346 | 11/1962 | Lloyd et al. | 90—11.52 |
| 3,105,288 | 10/1963 | Johnson et al. | 51—327 X |
| 3,138,065 | 6/1964 | Owens et al. | 51—50 X |
| 3,169,639 | 2/1965 | Bauer et al. | 209—74 |
| 3,203,137 | 8/1965 | Owens et al. | 51—50 |
| 3,241,452 | 3/1966 | Wellrad | 90—11.62 |
| 3,264,787 | 8/1966 | Anderson et al. | 51—37 |

HAROLD D. WHITEHEAD, Primary Examiner

U.S. Cl. X.R.

51—327